US012686588B2

(12) United States Patent
Davidian et al.

(10) Patent No.: US 12,686,588 B2
(45) Date of Patent: Jul. 21, 2026

(54) SYSTEM AND METHOD FOR HYDRAULIC-PNEUMATIC DRIVE WITH ENERGY STORAGE FOR ELEVATORS

(71) Applicants: Dan Davidian, Rosh Ha'ayan (IL); Yair Moshe Holland, Ra'anana (IL); Avinoam Livni, Haifa (IL)

(72) Inventors: Dan Davidian, Rosh Ha'ayan (IL); Yair Moshe Holland, Ra'anana (IL); Avinoam Livni, Haifa (IL)

( * ) Notice: Subject to any disclaimer, the term of this patent is extended or adjusted under 35 U.S.C. 154(b) by 1226 days.

(21) Appl. No.: 17/467,244

(22) Filed: Sep. 5, 2021

(65) Prior Publication Data

US 2022/0162038 A1 May 26, 2022

Related U.S. Application Data

(63) Continuation-in-part of application No. PCT/IL2020/050255, filed on Mar. 4, 2020.

(Continued)

(51) Int. Cl.
*B66B 1/30* (2006.01)
*B66B 1/34* (2006.01)

(Continued)

(52) U.S. Cl.
CPC .............. *B66B 1/30* (2013.01); *B66B 1/3476* (2013.01); *B66B 5/0037* (2013.01); *B66B 11/0423* (2013.01); *B66B 11/0461* (2013.01)

(58) Field of Classification Search
CPC ....... B66B 1/30; B66B 1/3476; B66B 5/0037; B66B 11/0423; B66B 11/0461;

(Continued)

(56) References Cited

U.S. PATENT DOCUMENTS 4,509,330 A 4/1985 Zimber et al.
5,346,038 A * 9/1994 Rehfeld .................... B66B 9/04 187/273

(Continued)

FOREIGN PATENT DOCUMENTS

DE 102015222983 A1 5/2017
DE 102016201410 A1 8/2017

(Continued)

OTHER PUBLICATIONS

International search report for PCT/IL2020/050255 dated Jun. 24, 2020.
Written opinion for PCT/IL2020/050255 dated Jun. 24, 2020.

*Primary Examiner* — Jeffrey Donels
(74) *Attorney, Agent, or Firm* — The Roy Gross Law Firm, LLC; Roy D. Gross

(57) ABSTRACT

A power drive for a passenger and/or cargo elevator—or any conveyance-using stored high pressure compressed air as a primary source, producing high pressure hydraulic fluid energy to move a servo-controlled hydraulic motor, mechanically connected to the hoisting mechanism of the elevator, is disclosed. The electric power driving the air compressor is not affected by the load of the elevator (e.g. number of passengers). The electric current is consumed to charge a high pressure air tank. The compressor is operated only when the elevator is in in a parked position, thus electric power consumption level is by no means correlated to the operational mode of the elevator motion.

44 Claims, 7 Drawing Sheets

Related U.S. Application Data

(60) Provisional application No. 62/813,793, filed on Mar. 5, 2019.

(51) Int. Cl.
*B66B 5/00* (2006.01)
*B66B 11/04* (2006.01)

(58) Field of Classification Search
CPC ..... B66B 1/04; B66B 1/24; B66B 9/04; F15B 11/05; F15B 11/048; F15B 2211/216; F15B 2211/30535; F15B 2211/40515; F15B 2211/40584; F15B 2211/41527; F15B 2211/426; F15B 2211/455; F15B 2211/465; F15B 2211/6313; F15B 2211/6336; F15B 2211/6656; F15B 2211/7058; F15B 2211/755; F15B 2211/7653; F15B 11/0725; Y02B 50/00; H02J 15/006
See application file for complete search history.

(56) References Cited

U.S. PATENT DOCUMENTS

| | | | | |
|---|---|---|---|---|
| 6,354,080 | B1 | 3/2002 | Decker | |
| 10,611,600 | B2 * | 4/2020 | Morrison | B66B 1/24 |
| 11,198,585 | B2 * | 12/2021 | Samba Murthy | B66B 9/04 |
| 11,498,801 | B2 * | 11/2022 | Derbarmdiger | B66B 1/26 |
| 2004/0173412 | A1 | 9/2004 | Birbaumer et al. | |
| 2009/0025379 | A1 | 1/2009 | White | |
| 2009/0282822 | A1 | 11/2009 | Mcbride et al. | |
| 2013/0126277 | A1 * | 5/2013 | Friedman | B66B 3/00 187/384 |
| 2014/0014318 | A1 | 1/2014 | Mail | |
| 2014/0174860 | A1 | 6/2014 | Yakuel et al. | |
| 2014/0364272 | A1 * | 12/2014 | Shapira | B60W 10/08 477/3 |
| 2019/0092602 | A1 * | 3/2019 | Harel | B66B 1/3453 |
| 2019/0127177 | A1 * | 5/2019 | Derbarmdiger | B66B 1/3415 |
| 2021/0139283 | A1 * | 5/2021 | Greenberg | B66B 1/04 |
| 2021/0261382 | A1 | 8/2021 | Harel | |

FOREIGN PATENT DOCUMENTS

| | | | | |
|---|---|---|---|---|
| EP | 1988294 | B1 | 7/2012 | |
| EP | 3882194 | A2 | 9/2021 | |
| IL | 221842 | A | 12/2017 | |
| IL | 272899 | A | 8/2021 | |
| IN | 2014MU01147 | A | 11/2015 | |
| WO | WO-2013035060 | A1 * | 3/2013 | B66B 17/12 |
| WO | WO-2015019357 | A1 * | 2/2015 | B66B 1/44 |

* cited by examiner

SYSTEM AND METHOD FOR HYDRAULIC-PNEUMATIC DRIVE WITH ENERGY STORAGE FOR ELEVATORS

CROSS-REFERENCE TO RELATED APPLICATIONS

This application is a Continuation-in-Part application of International (PCT) Patent Application No. PCT/IL2020/050255 filed Mar. 4, 2020, which claims the benefit if U.S. Provisional Patent Application Ser. No. 62/813,793 filed Mar. 5, 2019, both of which are incorporated herein by reference in their entirety.

FIELD OF THE INVENTION

The invention relates to a system for providing operating power to an elevator (of the type typically used for passengers and/or cargo in buildings); and in particular to a pneumatic energy storage system used to drive a hydraulic system, as an alternative or as an add-on to an electromechanical system.

BACKGROUND OF THE INVENTION

There are religious Jewish communities whose religious traditions forbid one to use electricity or operate electrically-powered appliances, including passenger elevators, on Saturday and Jewish holydays.

Elevators designed for such communities operate automatically, stopping at each floor and opening and closing the doors at predetermined time intervals. Such elevators are colloquially called "Shabbat elevators."

Some Jewish communities further demand that, on these holy days, the electric power consumption is not directly affected by the weight of the passengers. This need has encouraged the development of load-independent electric-power consumption Shabbat elevators.

US20140364272A1 discloses a system, including a transportation device, configured to operate under at least a first condition and a second condition, wherein the transportation device is configured to operate without a human induced change in an electrical current during the second condition. A disengageable motor is configured to operate the transportation device under the first condition and coupled to the transportation device. A disengageable energy storage device is configured to operate the transportation device under the second condition and coupled to the transportation device, wherein the disengageable energy storage device may be automatically recharged by a charging device when the energy storage device is disengaged. A mechanical processing unit mechanically controls the motion of the transportation device.

The present invention advances the technology of Shabbat elevators, as further described herein.

SUMMARY OF THE INVENTION

There are two important considerations for designing Shabbat elevators:

According to an aspect of the invention, electric power consumed by an elevator drive system (e.g. from the electric grid and/or generator and/or batteries etc.) is not directly affected by the weight of the passengers and/or cargo (hereinafter, "the load") in the elevator cabin. The electric power consumption does not increase when the total load increases, for example when there are more passengers Additionally, according to an aspect of the invention, the weight of the load does not influence the timing of any electric actuators or electric sensors. Such an influence would cause a passenger entering or leaving the elevator to hasten the activation time of the actuator or sensor, which is tantamount to using electricity on the holy day. Therefore, for example, factors such as cabin velocity that influence the timing of sensors, such as a floor-level limit switch, should not be influenced by the weight of the cabin load—i.e., that the speed of the elevator cabin should be the same whether the cabin is empty, partially loaded, or fully loaded.

The present invention provides a power system for elevators that stores pneumatic energy of high-pressure compressed air to drive the elevator via hydraulic means, while electric power is drawn from mains only when the elevator is not in motion. When the elevator is in use, electric power is disconnected and the elevator is moved by compressed air energy. When the elevator is stopped, an air compressor is operated drawing constant electric power to charge an air tank.

The pneumatic-hydraulic system consumes electric power to drive the compressor only when the elevator is not in motion, thus there is no correlation between the load and motion of the elevator and the electric current consumed by the pneumatic system.

(It should be noted that an increased frequency, under higher loading levels, of charges by an electric compressor motor is not forbidden according to most rabbinic authorities, because (in some embodiments) the charges occur during indeterminate periods when the cabin is not in motion and therefore do not constitute direct usage of electricity.)

The pneumatic-hydraulic system may also serve as emergency operational power source in cases when electricity is disconnected.

It is within the scope of the invention to provide a pneumatic-hydraulic drive system for a conveyance whose electric power consumption is unaffected by weight load carried on the conveyance, the system comprising a. a bi-directional hydraulic motor, configured to power motion of a conveyance;
b. two pneu-hydraulic accumulators configured to feed hydraulic energy to the bi-directional hydraulic motor;
c. two 3-way, 2-position pressure-compensated flow control solenoid valves each disposed between one of the hydraulic actuators, and the bi-directional hydraulic motor, configured to alternately supply hydraulic fluid to a high-pressure line and a low-pressure return line;
d. a pressurized air tank configured to supply pressurized air to the pneu-hydraulic accumulators;
e. a multistage air compressor configured to charge the pressurized air tank; and
f. a compressor drive motor, configured to operate the compressor when the conveyance is at rest.

wherein electric power consumption of the system and speed of the conveyance are independent of the weight of passengers and cargo riding in the conveyance.

It is further within the scope of the invention to provide the previous pneumatic-hydraulic drive system, wherein the conveyance is a Shabbat elevator, a regular elevator, an automobile, a motorcycle, a scooter, a bicycle, a tricycle, a wheelchair, an escalator, a boat, or a ship.

It is further within the scope of the invention to provide a pneumatic-hydraulic drive system for an elevator whose electric power consumption is unaffected by weight load carried in the elevator, the system comprising a. a bi-directional hydraulic motor, configured to power vertical motion of an elevator;

b. two pneu-hydraulic accumulators configured to feed hydraulic energy to the bi-directional hydraulic motor;
c. two 3-way, 2-position pressure-compensated flow control solenoid valves
d. each disposed between one of the hydraulic actuators, and the bi-directional hydraulic motor, configured to alternately supply high and low pressure return-line fluid;
e. a pressurized air tank configured to supply pressurized air to the pneu-hydraulic accumulators;
f. a multistage air compressor configured to charge the pressurized air tank; and
g. a compressor drive motor, configured to operate the compressor when the elevator is at rest.

wherein electric power consumption of the system, speed of the elevator cabin, and travel time between floors are independent of the weight of passengers and cargo riding in the elevator cabin.

It is further within the scope of the invention to provide the previous pneumatic-hydraulic drive system, wherein energy for the vertical motion of the elevator between different floors and/or along a specific floor is provided by any combination of a. the bi-directional hydraulic motor or an electric motor;
b. the weight of the elevator cabin and its load; and
c. the weight of the elevator's counterweight.

It is within the scope of the invention to provide any of the above pneumatic-hydraulic drive systems for an elevator, wherein the compressor drive motor is configured to operate only when the elevator is at rest.

It is further within the scope of the invention to provide any of the above pneumatic-hydraulic drive systems for an elevator, further configured, after release of an electromagnetic brake of the elevator and before start of the hydraulic motor, to sense the impending movement direction of the elevator by, for example, sensing the hydraulic liquid pressure.

It is further within the scope of the invention to provide the previous pneumatic-hydraulic drive system for an elevator, further configured to employ the movement direction data to compute the extent to which each of the following elements are used for driving the elevator cabin:

a. the bi-directional hydraulic motor or an electric motor;
b. the weight of the elevator cabin and its load; and
c. the weight of the elevator's counterweight.

It is further within the scope of the invention to provide any of the above pneumatic-hydraulic drive systems for an elevator, further comprising a velocity-control subsystem comprising one or more encoders for velocity control of the elevator cabin; the encoders configured to measure one or of acceleration, deceleration, and velocity of the elevator.

It is further within the scope of the invention to provide the previous pneumatic-hydraulic drive system for an elevator, wherein the velocity-control encoders comprise one or more type in a group consisting of mechanical, electrical, centrifugal element, servo valve, and pressure compensated flow control valve.

It is further within the scope of the invention to provide any one the previous two pneumatic-hydraulic drive systems for an elevator, wherein the velocity-control subsystem is forced to either a partially or fully opened or closed state (e.g. by using solenoid) as currently needed, thus the more passengers and/or cargo are present in the elevator's cabin the less mechanical and/or electric changes occur in the system (e.g. by removing the preventive elements).

It is further within the scope of the invention to provide any of the three previous pneumatic-hydraulic drive systems for an elevator, wherein the velocity-control subsystem is further configured to compensate for leaks of the hydraulic fluid in the system, e.g. for the purpose of controlling the elevator's cabin velocity.

It is further within the scope of the invention to provide any of the above pneumatic-hydraulic drive systems for an elevator, wherein at the beginning of cabin motion from rest, the hydraulic engine starts at full power.

It is further within the scope of the invention to provide any of the above pneumatic-hydraulic drive systems for an elevator, wherein the speed of the hydraulic motor is controlled by two pressure compensated motor-flow control valves, set primarily to a predetermined flow values by adjusting the required restriction in the fixed orifices of the motor-flow control valves.

It is further within the scope of the invention to provide any of the above pneumatic-hydraulic drive systems for an elevator, wherein piston movement of the two pressure-compensated flow control solenoid valves gets smaller with increasing total weight of the elevator cabin, including passengers and cargo.

It is further within the scope of the invention to provide any of the above pneumatic-hydraulic drive systems for an elevator, wherein the solenoid is used to hold the valves' pistons in maximal open/close state according to the total weight of the elevator's cabin and the movement direction (up/down).

It is further within the scope of the invention to provide any of the above pneumatic-hydraulic drive systems for an elevator, backed up with either a mechanical or electric encoder connected to the main gear's shaft of the hoisting mechanism of the elevator, e.g. for safety purposes.

It is further within the scope of the invention to provide any of the above pneumatic-hydraulic drive systems for an elevator, wherein the elevator is switchable between three modes of operation Shabbat mode, wherein the hydraulic motor operates with load-independent electric power consumption;

"Normal Electric" mode, wherein an electric motor is drives the elevator without the hydraulic motor; and "Normal Hydraulic" mode, wherein the hydraulic motor is fed by a pump and drives the elevator without the electric motor.

It is further within the scope of the invention to provide the previous pneumatic-hydraulic drive system for an elevator, further configured so that in Shabbat mode the hydraulic motor might begin moving the elevator after a random time interval after closing of the elevator doors.

It is further within the scope of the invention to provide either of the previous two pneumatic-hydraulic drive systems for an elevator, wherein the random time delay is not less than a difference in time periods it takes the elevator to arrive at its next destination/floor when the cabin is empty (with no passengers and/or cargo) and with a full load.

It is further within the scope of the invention to provide any of the above pneumatic-hydraulic drive systems for an elevator, wherein stopping the elevator's cabin at a floor (story) level is performed using a plurality of limit switches.

It is further within the scope of the invention to provide the previous pneumatic-hydraulic drive system for an elevator, wherein the limit switches comprise electric, magnetic, photoelectric, mechanical, pneumatic, or hydraulic switches or any combination thereof.

It is further within the scope of the invention to provide either of the previous two pneumatic-hydraulic drive systems for an elevator, wherein the time it takes to begin a deceleration process is random; the timing of the limit switches' operation and of the elevator's cabin stopping process mechanism is thereby not affected by the load weight or by the direction of motion.

It is further within the scope of the invention to provide any of the above pneumatic-hydraulic drive systems for an elevator, wherein stopping the elevator's cabin is performed by decreasing the hydraulic pressure to the hydraulic motor and at the same time operating the electromechanical brake of the hoisting gear. This way the cabin's velocity may be decelerated gradually until full stop. This deceleration may set a soft stop of the cabin motion (without overshooting or shock).

It is further within the scope of the invention to provide any of the above pneumatic-hydraulic drive systems for an elevator, wherein a central control unit synchronizes and operates the flow of high pressure compressed air from the air tank to the accumulators, whereby when one accumulator is under high air pressure, its hydraulic fluid is transferred to the hydraulic motor while the other accumulator is vented without pressure and hydraulic fluid return line fills this accumulator. When one of the accumulators is with minimal fluid quantity and level, the position of its piston is sensed by proximity sensor commanding switching of air and fluid from the other accumulator.

It is further within the scope of the invention to provide any of the above pneumatic-hydraulic drive systems for an elevator, wherein a main control unit operates the cooling system of the hydraulic fluid by energizing air fan blowing air through liquid to air heat exchanger, thus keeping hydraulic fluid at constant temperature.

It is further within the scope of the invention to provide any of the above pneumatic-hydraulic drive systems for an elevator, wherein signals of malfunctioning of the system are displayed and serve to shut down the operation of the elevator in case of a major fault.

It is further within the scope of the invention to provide the previous pneumatic-hydraulic drive system for an elevator, further configured, upon the malfunctioning signal, to record in a log an attempt to repair the malfunction.

It is further within the scope of the invention to provide the previous pneumatic-hydraulic drive system for an elevator, further comprising a person presence detector in the elevator cabin, activated upon the attempt to repair the malfunction, wherein if no person presence is sensed, the system is configured to disable the elevator's driving system.

It is further within the scope of the invention to provide any of the above pneumatic-hydraulic drive systems for an elevator, further comprising a mechanical speed stabilizer.

It is further within the scope of the invention to provide the previous pneumatic-hydraulic drive system for an elevator, wherein the mechanical speed stabilizer operates by centrifugal speed controller and via a gear system and moves the restrictors of the hydraulic flow controllers to bring the hydraulic motor to constant speed regardless of the load.

It is further within the scope of the invention to provide any of the above pneumatic-hydraulic drive systems for an elevator, wherein the time periods it takes the elevator to arrive at its next destination/floor is not dependent on the weight of the passengers and/or cargo.

It is further within the scope of the invention to provide any of the above pneumatic-hydraulic drive systems for an elevator, further comprising an acoustic and/or visual indicator activated before and during closing of the elevator doors.

It is further within the scope of the invention to provide the previous pneumatic-hydraulic drive system for an elevator, wherein the indicator is selected from a group consisting of a buzzer, a vocal time indication, a stop light, a count-down time display, or any combination thereof.

It is further within the scope of the invention to provide the previous pneumatic-hydraulic drive system for an elevator, further configured for rescuing passengers in case of an emergency situation, such as a blackout.

It is further within the scope of the invention to provide the previous pneumatic-hydraulic drive system for an elevator, further comprising a hydraulic dummy load whose applied force is about equal to the maximum load weight of the elevator; wherein the dummy load is added to the load of the system to cause the system to produce its maximum hydraulic power; and wherein the system is further configured to remove the dummy load, allowing the system to reach said constant velocity.

It is further within the scope of the invention to provide a pneumatic-hydraulic method for driving a conveyance, wherein electric power consumption is unaffected by weight load carried on the conveyance, the method comprising steps of a. providing a pneumatic-hydraulic drive system for a conveyance;
b. operating a compressor when the conveyance is at rest;
c. charging a pressurized tank with the compressor;
d. supplying pressurized air to two pneu-hydraulic accumulators, by the pressurized tank;
e. alternately supplying fluid to a high-pressure line and a low-pressure return line of the pneu-hydraulic accumulators; and
f. powering motion of the conveyance, by fluid in the high pressure line.

It is further within the scope of the invention to provide a pneumatic-hydraulic method for driving an elevator, wherein electric power consumption is unaffected by weight load carried in the elevator, the method comprising steps of a. providing a pneumatic-hydraulic drive system for an elevator;
b. operating a compressor when the elevator is at rest;
c. charging a pressurized tank with the compressor;
d. supplying pressurized air to two pneu-hydraulic accumulators, by the pressurized tank;
e. alternately supplying fluid to a high-pressure line and a low-pressure return line of the pneu-hydraulic accumulators; and powering vertical motion of the elevator, by fluid in the high pressure line.

LIST OF FEATURES IN THE DRAWINGS

Figure 1:
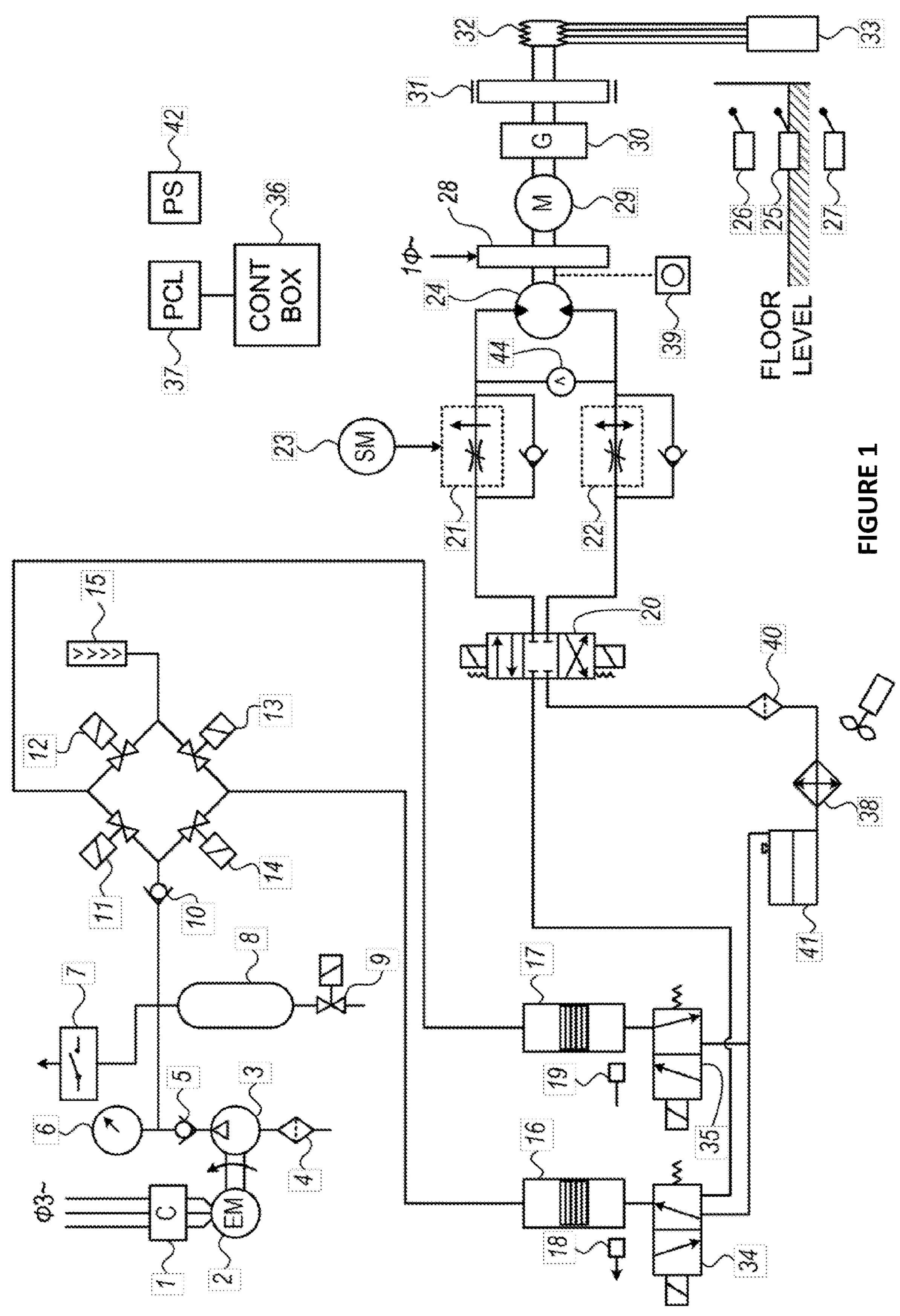
FIG. 1 schematically illustrates a mechanical schematic diagram of a pneumatic-hydraulic drive system for an elevator, according to some embodiments of the invention.

1 Compressor motor contactor
2 Compressor motor
3 High pressure air compressor
4 Compressor intake filter
5 Check valve 1
6 Tank pressure manometer
7 Tank pressure electronic transducer
8 Main high pressure air tank
9 Drain cock
10 Check valve 2
11-14 High-pressure 2-way, 2-position air solenoid valves
15 Air exhaust muffler
16-17 Air-over-oil piston accumulators
18-19 Magnetic proximity sensors for piston position
20 Up-down 4-way, 3-position closed center selector—solenoid operated
21-22 Pressure-compensated flow controllers with check valve, variable
restrictor
23 Motor for restrictor area changing
24 Hydraulic motor—fixed displacement—2 rotation directions
25 Floor-level limit switch
26 Descending speed-lowering limit switch
27 Ascending speed-lowering limit switch
28 Electrically operated clutch
29 Main electric elevator motor
30 Main elevator hoisting gearbox
31 Elevator electrically operated brake
32 Cables wheel
33 Cabin
34-35 3-way, 2-position solenoid valves
36 Main control and relays box
37 Programmable logic controller (PLC)
38 Oil cooler (air over fins)
39 Shaft encoder
40 Oil micronic filter
41 Oil tank
42 Power supply
44 Differential pressure transducer
75 Gearbox
76 Electromagnetic clutch
77A-77B Spur gears
78A-78B Flow controllers
79 Torsion spring
302 Transmission (may be similar to spur gears 77A-77B)
303 Centrifugal mechanical speed contn
304 Preloaded spring
305 Sliding sleeve
306 Rack
307 Pinion
308-309 Small gear motor
310 Differential
520, 620, 720 Up/Down selector
524, 624 Hydraulic motor
526, 626 Hydraulic fluid leakage collector
539 Encoder
580 Electro-hydraulic servo valve
585 Controller
680 Mechanically operated servo valve
690 Mechanical speed governor
695 Mechanical velocity feedback link
738 Oil cooler
740 Micronic filter
741 Oil tank
792 Diaphragm
795 Air pressure reducer
800 Elevator cabin
805 Microswitch activator
810 Sliding track
815 Output rack
820 Pinion
825 Input rack
830 Springs

DETAILED DESCRIPTION OF THE INVENTION

The following description with the referenced drawings describe the present invention. The description and drawings are non-limiting. Some disclosed features may not appear in some embodiments of the invention. Furthermore, some embodiments of the invention may include additional undisclosed features.

The disclosure is made in reference to driving a Shabbat elevator. However, it is appreciated that a person skilled in the art may employ the teachings of the invention described herein to provide a drive system to power any conveyance, including a wheeled vehicle such as an automobile, a motorcycle, a scooter (e.g., a mobility scooter such "Kalnoit" scooters), a bicycle, a tricycle, or a wheelchair; an escalator; and a boat or ship.

Whether for driving an elevator or another conveyance, embodiments of the invention include drivers of conveyances intended for Shabbat use (i.e., the driver's electric power consumption is independent of weight load on the conveyance) and of conveyances intended for weekday use (i.e., the driver's electric power consumption is not necessarily independent of weight load on the conveyance).

It is furthermore appreciated that although this disclosure is made in reference to a pneumatically driven hydraulic system, the teachings of the invention described herein may be applied by a person skilled in the art to provide a hydraulically driven pneumatic system as well.

Reference is now made to FIG. 1, schematically illustrating a mechanical schematic diagram of a pneumatic-hydraulic drive system 100 (hereinafter also referred to as "drive system") for an elevator, according to some embodiments of the invention.

Drive system 100 comprises a compressor drive motor 2, typically an electric motor, which drives an air compressor 3, typically a multi-stage compressor. Air compressor 3 charges a high-pressure air tank 8. One or more sensors 6, 7 monitor air pressure in air tank 8. A vent solenoid valve 9 enables evacuation of air tank 8 and system lines, if needed.

Compressed air is fed to a set of two pneu-hydraulic accumulators 16, 17, which can be piston type. The compressed air is fed via an array of four solenoid valves 11 12 13 14. An air chamber on one side of the piston of one accumulator 16, 17 is filled with high pressure air and the hydraulic chamber on the other side of the piston is filled with pressurized hydraulic fluid. At the same time, the other accumulator 17, 16 is vented, filled with low pressure hydraulic fluid is filling it from return line.

The pneu-hydraulic accumulators 16, 17 alternate in providing of high and low hydraulic pressure. When the fluid in the first accumulator 16, 17 is at a minimal level, magnetic sensors 18, 19 trigger valves 11, 12, 13, 14 to change position and to feed the other accumulator 17, 16 with high pressure air which causes feeding high pressure fluid to the system.

Flow control valves 34, 35 of each pneu-hydraulic accumulator 16, 17 assure permanent flow of hydraulic fluid in the pressure and return lines connected to hydraulic motor's 24 lines. Flow control valves 34, 35 can be pressure-compensated and can comprise 3-way, 2-position solenoid valves.

Hydraulic fluid is fed to a set of two motor-flow control valves 21, 22, preferably pressure compensated, connected to a bidirectional hydraulic motor 24. Hydraulic motor 24 is optionally mechanically connected via a clutch 28 to the shaft of the main gear of the hoisting mechanism of the elevator. Hydraulic motor speed is thereby fixed at a predefined level, and not affected by the fluid pressure caused by the load, neither in up nor down directions.

Hydraulic motor 24 may function as the only motor in the system driving the elevator. Alternatively, hydraulic motor 24 and a conventional electric motor are selectable, and the elevator could have the following modes of operation:

"Normal Electric" mode—The electric motor drives the elevator without the hydraulic motor.

"Normal Hydraulic" mode—The hydraulic motor is fed by a pump and drives the elevator without the electric motor.

"Shabbat" mode—The hydraulic motor is fed as described in this document.

An encoder 39 is connected to the hoisting mechanism shaft. Its output is used as a velocity feedback to control and stabilize the deceleration stage of the motion of the elevator in both directions, up and down.

The return fluid is stored in an oil tank 41. The fluid is cooled by an air cooled heat exchanger 38 and filtered by a micronic filter 40. After passing through cooling and filtering, hydraulic fluid returns to accumulators 16, 17.

Stopping of the elevator cabin at each floor (station) is done by sensing its position by a limit switch 25 placed at floor level at all floors. Limit switch 25 cuts hydraulic power by centering a selector valve 20 and at the same time operating the electro-mechanical brake 31 of the hoisting gear.

In order to decelerate the cabin's velocity before total halting, two additional limit switches 26 27 mounted at predetermined distances (approximately 400 mm) from two sides of floor limit switch 25 (along elevator's track). When one of limit switches 26 27 is actuated, a small electric control motor 23 is operated, gradually closing the restrictor orifice openings of the flow controller 21 22, thus reducing hydraulic flow rate to the hydraulic motor 24 gradually. Upon reaching final stop, the cabin has a very low speed of approach. After reaching full stop, the control motor 23 returns the orifice openings to their originally set area to enable full speed motion continuation. In some embodiments, the time it takes to begin a deceleration process is random. Therefore the limit switches' operation and the elevator's cabin stopping process mechanism is not affected by the cabin load (not by passenger weight/count, cargo weight, nor direction of motion).

Figure 2:
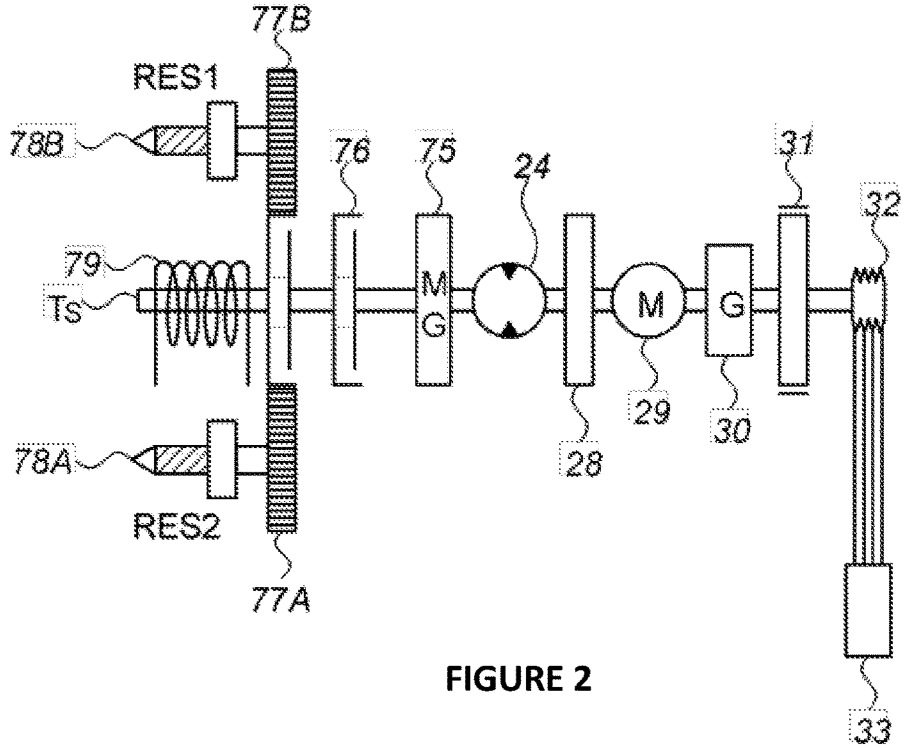
FIG. 2 schematically illustrates a mechanical schematic diagram of a decelerator for a pneumatic-hydraulic elevator drive system, according to some embodiments of the invention.

Reference is now made to FIG. 2, schematically illustrating a decelerator for a pneumatic-hydraulic elevator drive system, according to some embodiments of the invention. A mechanical connection of the shaft of main hydraulic motor 24 to the flow controllers' restrictors operates as follows:

The shaft of hydraulic motor 24 is connected to a small gearbox 75 which moves via electromagnetic clutch 76 and spur gears 77*a* 77*b* the restrictors of the flow controllers 78*a* 78*b*. Gearbox 75, furthermore, energizing a torsion spring 79. When the elevator's cabin actuates the deceleration limit switch, the clutch 75 is engaged and gradually closes restrictor passage orifices in flow controllers 78*a* 78*b* by rotating the gears 77*a* 77*b*. At the same time the spring 79 is energized. When the cabin reaches full stop and actuates the floor level limit switch, the clutch is de-energized and the spring's energy rotates the restrictors drive back to full opening position, ready for next acceleration movement of the cabin.

A differential pressure transducer 44 measures overload of the cabin is measured. When overload occurs, the pressure difference exceeds a predetermined limit. The elevator will not operate. An overload indication may be displayed.

A power supply 42 may convert the mains voltage (e.g. 220/110 volts 50/60 Hz) to the required voltages to feed a programmable logic controller PLC 37 and to optionally energize all sensors, relays and solenoid valves.

The hydraulic flow controllers 21, 22 serve to keep constant flow passing through them regardless the load, which varies according to passengers count and direction of motion (up or down).

The electro-mechanical clutch 28 connecting the hydraulic motor to hoisting gear electric motor shaft is engaged and transmits torque during hydraulic elevator operation.

When the elevator is moved by main electric motor 30, clutch 28 is disengaged and the pneumatic-hydraulic system is disabled, thereby cutting the hydraulic fluid supply, compressor drive motor 2 shuts down and vent valve 9 vents high pressure air tank 8.

Another optional feature of the system is a fully mechanical speed stabilizer controller which ensures that during all of the constant speed phase of motion, the elevator's speed in both directions (up & down) is not affected by the load.

Figure 3:
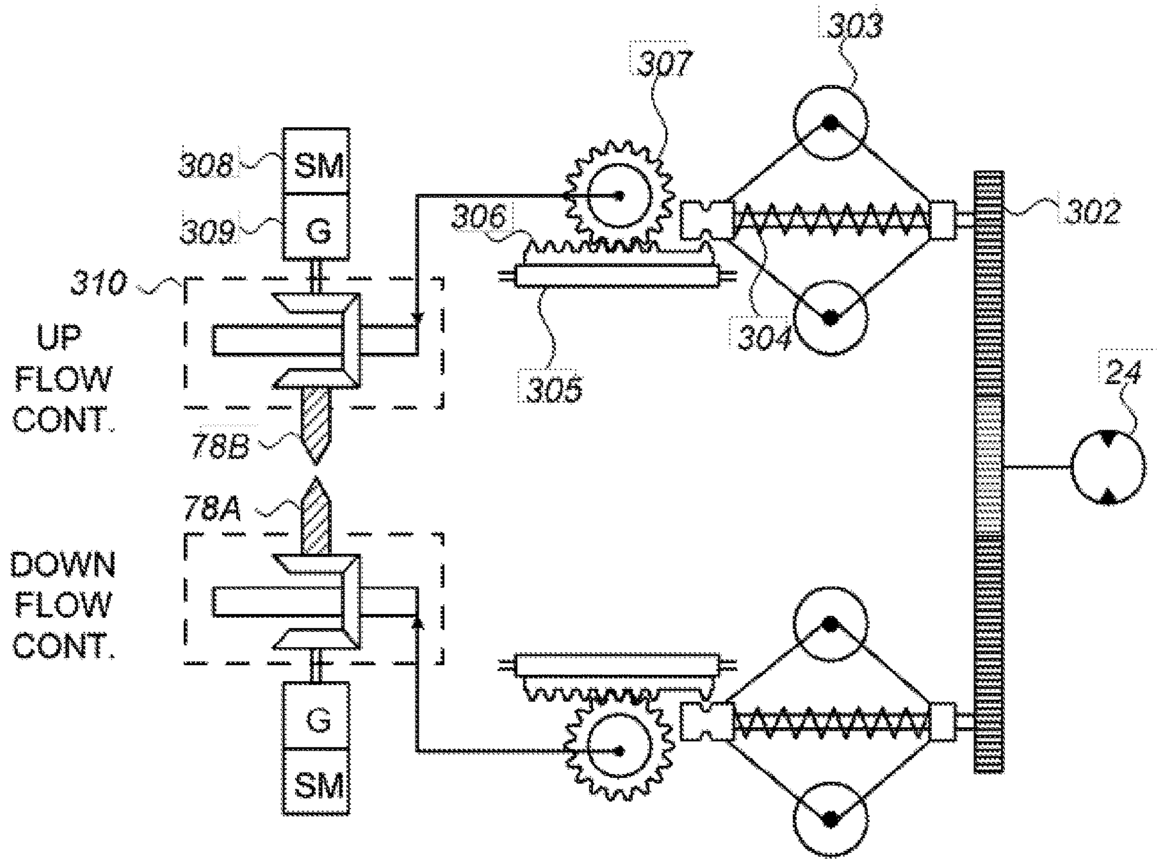
FIG. 3 schematically illustrates a fully mechanical speed stabilizer controller for an elevator pneumatic-hydraulic drive system, according to some embodiments of the invention.

Reference is now made to FIG. 3, schematically illustrating a speed-control embodiment. Two centrifugal mechanical speed controllers 303 are built of weights connected by arms to sliding sleeve 305 loaded by a preloaded spring 304. Upon increasing rotational speed, centrifugal force moves the sleeve with its rack 306, adding compression to the spring. Rack 306 turns a pinion 307 which is connected to corona wheel of a differential 310. Other sides of the differential wheels are connected to the hydraulic restrictor of the flow controller and to small gear motor 308 & 309 which is used to decelerate the cabin upon reaching station.

There are two identical mechanical speed controllers, one serves for upwards elevator movement and the other for downwards movement.

An elevator employing drive system 100 may be switchable between three modes of operation:

"Normal Electric" mode—An electric motor is driving the elevator without the hydraulic motor; and "Normal Hydraulic" mode—The hydraulic motor is fed by a pump and drives the elevator without the electric motor.

"Shabbat" mode, wherein the hydraulic motor operates with load-independent electric power consumption, substantially as described;

In Shabbat mode, the hydraulic motor may be configured to begin moving the elevator after a random time interval after closing of the elevator doors. The random time delay should be not less than the difference in time periods it takes the elevator to arrive at its next destination/floor when the cabin is empty (with no passengers and/or cargo) and with a full load. Such a mechanism decouples the connection between the time it takes the elevator to arrive at its next velocity deceleration process starting point and activating the limit switches placed at each floor and the weight of passengers and/or cargo. In this manner, activation of the limit switches will not occur earlier than it would have occurred without the random time delay.

The system is configured so that the time periods it takes the elevator to arrive its next destination/floor is not dependent on the load. These time periods will not get shorter when the load increases or decreases.

Additional Embodiments

In some embodiments, the time it takes the elevator's cabin to reach the velocity deceleration process starting point is always random. Therefore the limit switches' operation and the elevator's cabin stopping process mechanism is not affected by the elevator's load (passengers count, cargo weight, and direction of motion).

In some embodiments, stopping the elevator's cabin is performed by decreasing the hydraulic pressure to the hydraulic motor and at the same time operating the electro-mechanical brake of the hoisting gear. This way the cabin's velocity is decelerated gradually until full stop. This deceleration sets a soft stop of the cabin motion, without overshooting or shock.

Upon stopping at a floor station, the mechanism is returned to its initial state in order to enable driving the elevator's cabin to next floor (e.g. using solenoid, energized torsion spring etc.).

In some embodiments, a central control unit synchronizes and operates the flow of high pressure compressed air from the air tank to the accumulators.

When one accumulator is under high air pressure, its hydraulic fluid is transferred to the hydraulic motor while the other accumulator is vented without pressure and is being filled with hydraulic fluid.

In some embodiments, when one of the accumulators is with minimal fluid quantity and level, the position of its piston is sensed by proximity sensor.

In some embodiments, signals of malfunctioning of the system are displayed and serve to shut down the operation of the elevator in case of a major fault.

Major faults might be: filter high differential pressure, high fluid temperature, low air pressure, too low or too high motor speed, sensors and transducers malfunction, etc.

In some embodiments, in case of a system malfunction during a Shabbat or holiday, any technical treatment of the system (e.g. opening the controller, opening the engine etc.) will be recorded in a log. In some embodiments, a person presence detection element is then activated. If there are no people in the elevator cabin and such a technical treatment was carried out, the elevator's driving system is disabled. This feature can helps to avoid desecration of the Shabbat or holiday, as use of the elevator is forbidden if it was repaired on Shabbat or a holiday.

In some embodiments, the system further includes an acoustic and/or visual indicator. The indicator is activated before and during closing of the elevator door(s). The indicator alerts persons near the elevator that the doors are about to or are now closing. The alert helps one avoid desecration Shabbat or holiday caused by entering the elevator during the time the doors are closing (which typically triggers a sensor and door-opening mechanism, or may affect the electric power consumption of the door-closing mechanism). The alerting element can be a buzzer, vocal time indication, stop light, count-down time display, etc.

In some embodiments, the system further comprises a hydraulic dummy load whose applied force is about equal to the maximum load weight of the elevator. The dummy load is added to the load of the system to cause the system to produce its maximum hydraulic power. The system is later removes the dummy load, allowing the system to reach said constant velocity. The dummy load may added to the system at the beginning of each movement of the elevator and disconnected a short period of time afterwards.

Figure 4:
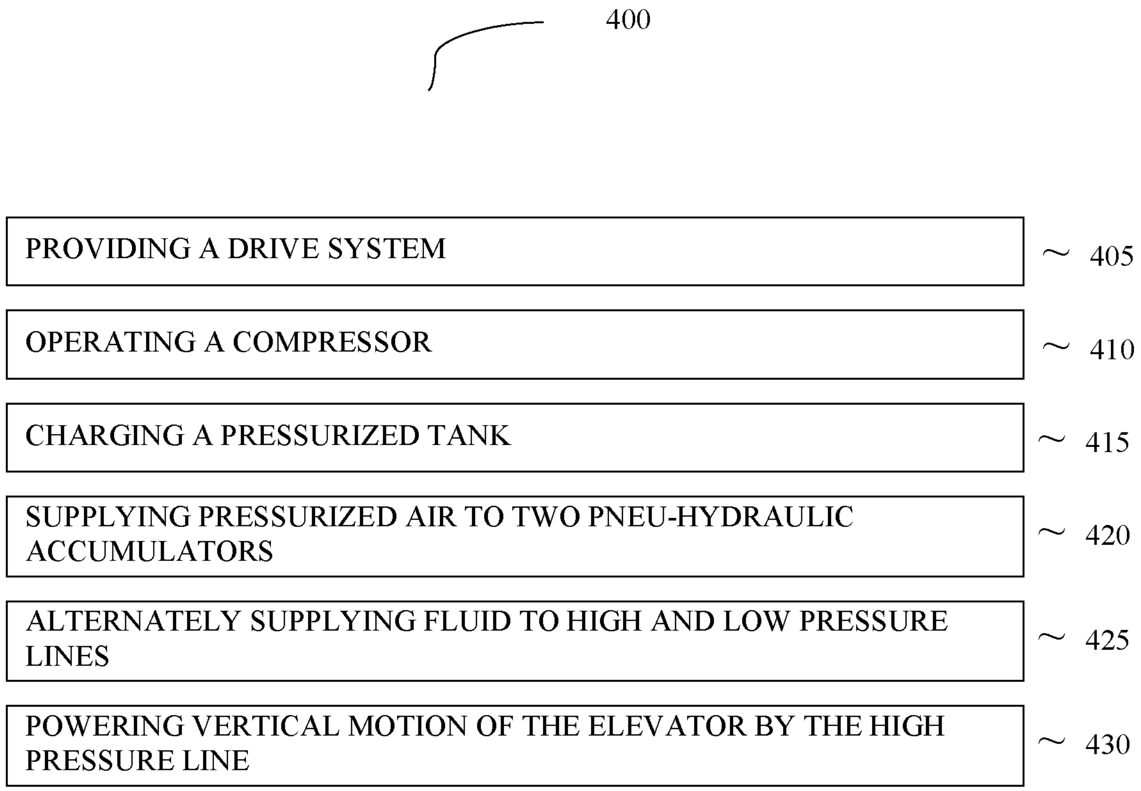
FIG. 4, shows steps of a pneumatic-hydraulic method for driving an elevator, according to some embodiments of the invention.

Reference is now made to FIG. 4, showing steps of a pneumatic-hydraulic method 400 for driving an elevator, wherein the electric power consumption of method 400 and the speed of the elevator cabin, and travel time between floors are independent of the weight of passengers and cargo riding in the elevator.

Method 400 comprises steps of a. providing a pneumatic-hydraulic drive system for an elevator of the invention 405;
b. operating a compressor when the elevator is at rest 410;
c. charging a pressurized tank with the compressor 415;
d. supplying pressurized air to two pneu-hydraulic accumulators, by the pressurized tank 420;
e. alternately supplying fluid to a high-pressure line and a low-pressure return line of the pneu-hydraulic accumulators 425; and
f. powering vertical motion of the elevator, by fluid in the high pressure line 430.

Figure 5:
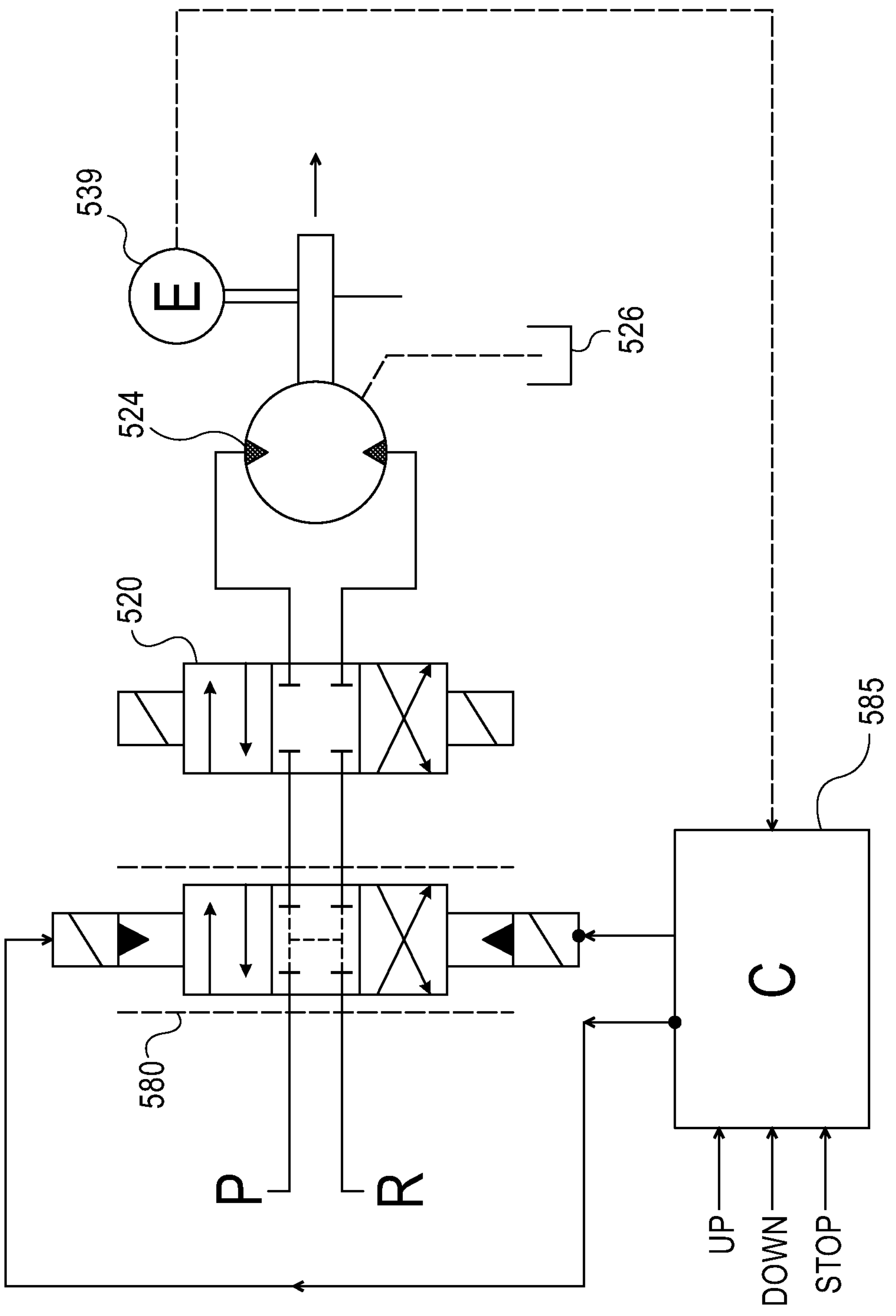
FIG. 5 schematically illustrates an electro-hydraulic servo system of a pneumatic-hydraulic drive system for an elevator, according to some embodiments of the invention.

Reference is now made to FIG. 5, schematically illustrating an electro-hydraulic (EH) servo system of a pneumatic-hydraulic drive system for an elevator, according to some embodiments of the invention.

During a momentary brake release before the start of motion of the elevator cabin, a controller 585 receives the weight of the cabin from a weighing mechanism (not shown). The weighing mechanism can be an axle torque sensor; measuring tension in a cable of said elevator; measuring pressure difference at two openings for the hydraulic fluid of the hydraulic motor; a strain sensor; a weight scale; a mechanical force gauge; a pressure difference gauge and any combination thereof.

The controller 585 sets the size of an oil passage opening of a pressure regulating valve 580 as a function of said load measurement, such that an arrival time of the elevator to a pre-determined next destination is independent of the measured load.

Optionally, the controller sets the opening size independently of load measurement, according to the maximum load of the elevator or half the maximum load of the elevator.

Upon initial motion of the elevator, a speed sensor 539 measures the velocity of the elevator cabin. In the embodiment shown, the speed sensor comprises a rotary encoder, giving a rotational velocity of an elevator hoisting shaft, from which the controller can determine linear velocity proportional to the rotational velocity. In other embodiments, the speed sensor 539 is a linear encoder, magnetic speed sensor, centrifugal speed sensor, pressure regulating valve, pressure-compensated flow control valve, or any combination thereof.

Figure 6:
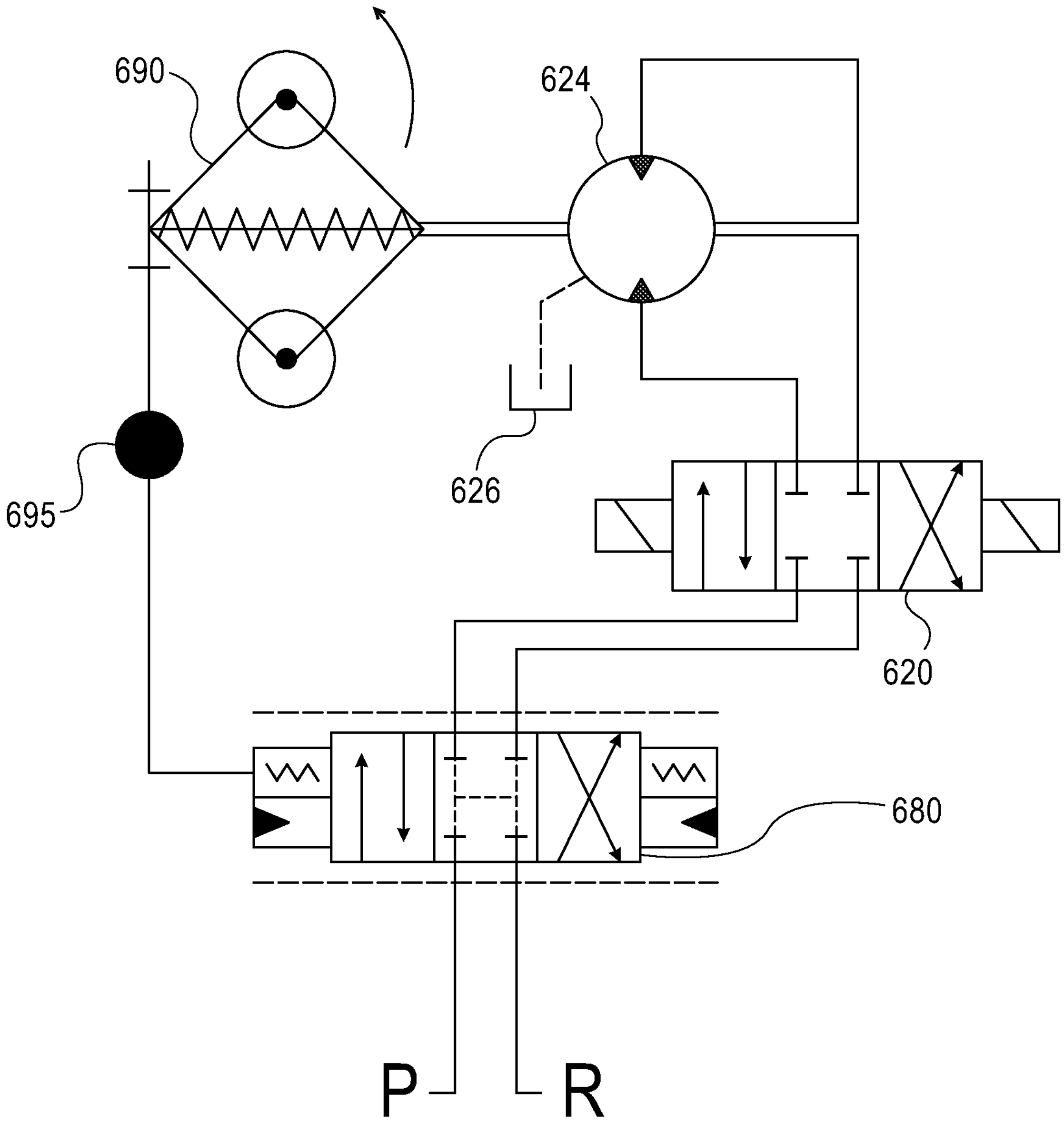
FIG. 6 schematically illustrates a mechanically controlled servo system of a pneumatic-hydraulic drive system for an elevator, according to some embodiments of the invention.

Reference is now made to FIG. 6, schematically illustrating a mechanically controlled servo system of a pneumatic-hydraulic drive system for an elevator, according to some embodiments of the invention. The mechanical speed governor 690 is described in relation to FIG. 3. It is connected, by a mechanical velocity feedback link 695 (a lever, in the embodiment shown), to a mechanically operated servo valve 680. The servo valve 680 accordingly adjusts speed of the hydraulic motor 624. Optionally, the lines between the servo valve 680 and motor 624 pass through other elements such up/down selector valve 620, which do not necessarily contribute a feedback response.

Figure 7:
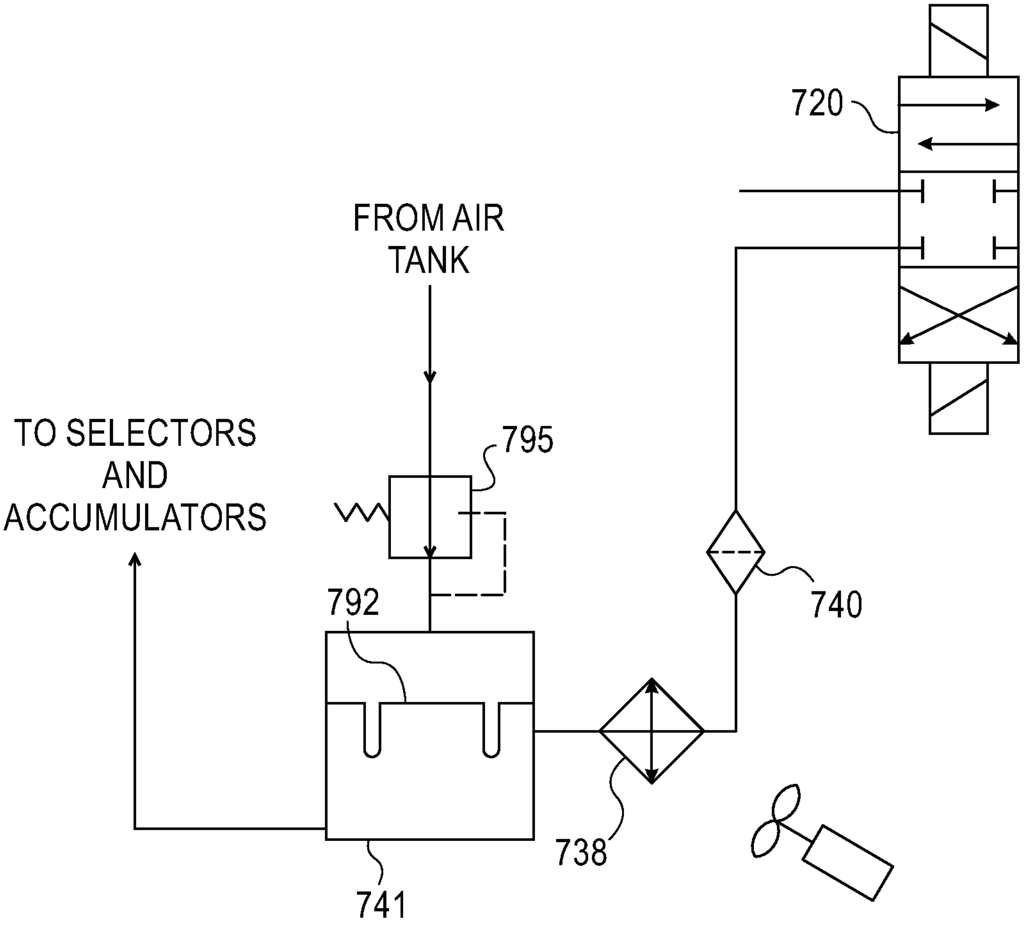
FIG. 7 schematically illustrates pressurization of an oil tank of a pneumatic-hydraulic drive system for an elevator, according to some embodiments of the invention.

Reference is now made to FIG. 7, schematically illustrating pressurization of a return oil tank 741 of a pneumatic-hydraulic drive system for an elevator, according to some embodiments of the invention.

Air from an air tank (not shown) applies pressure to a diaphragm 792 of the oil tank 741. A pressure reducer 795, preferably of 3 bars, is placed along the line from the air tank to the oil tank 741.

Pressurization of the return oil tank 741 assures safe hydraulic fluid filling of the accumulators 16-17 (see FIG. 1).

Figure 8:
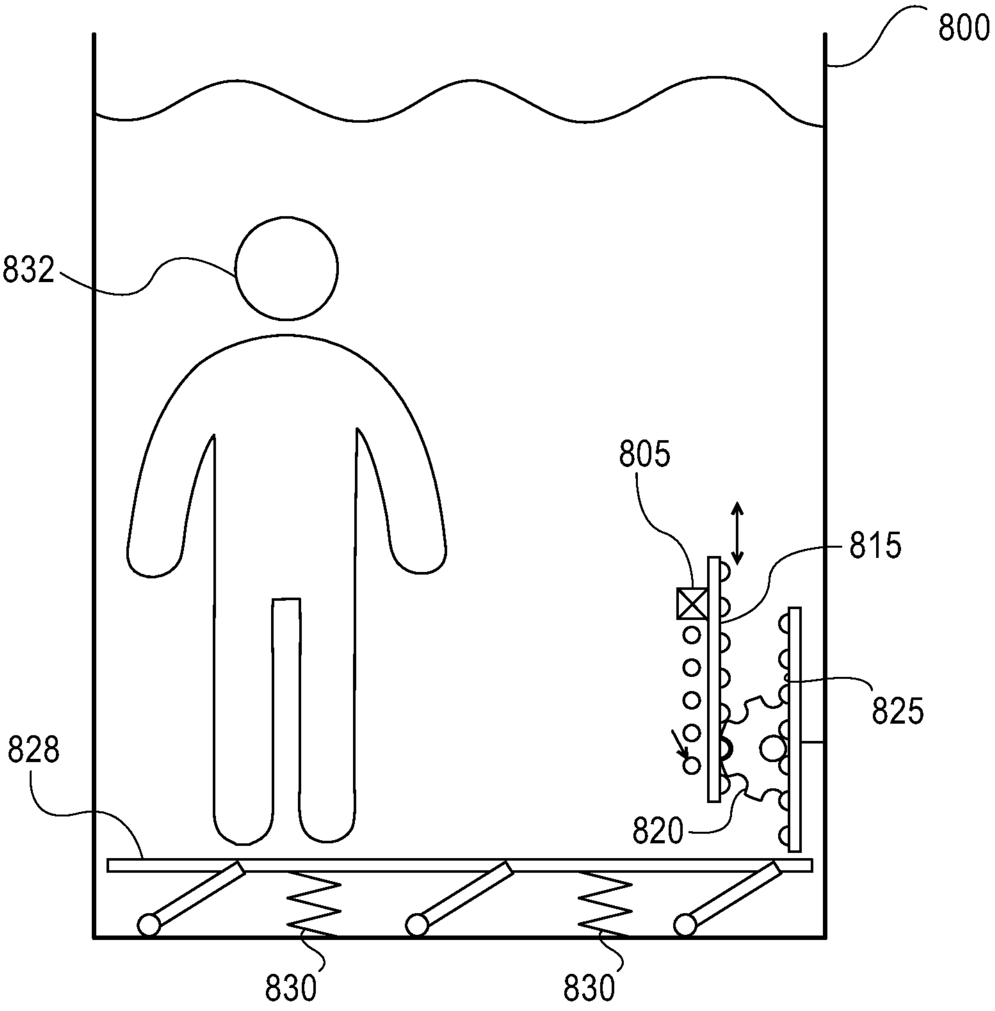
FIG. 8 illustrates a microswitch actuation height-changing mechanism for the cabin of an elevator, according to some embodiments of the invention.

Reference is now made to FIG. 8, illustrating a micro-switch actuation height-changing mechanism for the cabin of an elevator, according to some embodiments of the invention.

The floor 828 of an elevator cabin 800 is mounted on springs 830. A first cabin rack 825 is fixed to the elevator cabin 800. Generally, the first rack 825 is mounted to the front wall of the cabin. The weight of passengers 832 on the floor 828 causes a downward translation of the first rack 825.

The small gear of a dual pinon 820 rolls along the first rack 825. The large gear of the dual pinion rolls along a second rack 815. The second rack 815 is translated upward with the downward translation of the first rack 825. The translation magnitude of the second rack is amplified is amplified by the gear ratio of the large and small gears of the dual pinion 820.

A microswitch activator 805 is mounted on the second rack, on the side opposite to the teeth. The activator 805 can be a detent or a magnetic activator. The activator 805 activates an external slow-down limit switch (not shown) located in the elevator shaft.

With greater weight in the cabin, during upwards motion, the limit switch is activated earlier, giving the controller 585, 685 an earlier warning needed to adjust the slow-down profile (oil passage opening as a function of time) of the servo valve 580, 680 (see FIGS. 5 and 6), such that the arrival time at the next floor is independent of the cabin load. A similar rack-and-pinion design may be employed for downward motion.

The invention claimed is:

1. A pneumatic-hydraulic system for driving an elevator cabin, comprising, a bi-directional hydraulic motor 24, configured to power motion of the elevator cabin;

two pneu-hydraulic accumulators 16, 17, configured to feed hydraulic energy to the bi-directional hydraulic motor 24;

two 3-way, 2-position pressure-compensated flow control valves 34, 35, each disposed between one of the hydraulic actuators 16, 17 and the bi-directional hydraulic motor 24, configured to alternately supply hydraulic fluid to a high-pressure line and a low-pressure return line;

a pressurized air tank 8 configured to supply pressurized air to the pneu-hydraulic accumulators 16, 17;

a multistage air compressor 3 configured to charge the pressurized air tank 8; and a compressor drive motor 2, configured to operate said compressor 3;

wherein electric power consumption of the system and the cruising speed of the elevator cabin are substantially independent of the load of said cabin, including passengers and cargo riding in said cabin.

2. The system of claim 1, further comprising a weighing mechanism configured to measure said load during a brake release, after closing of doors of said elevator and before start of motion of said cabin, thereby determining an initial hydraulic pressure.

3. The system of claim 2, wherein said weighing mechanism comprises one or more elements in a group consisting of an axle torque sensor; measuring tension in a cable of said elevator; measuring pressure difference at two openings for the hydraulic fluid of the hydraulic motor; a strain sensor; a weight scale; a mechanical force gauge; a cylinder fluid pressure meter; a pressure difference gauge; an electric sensor; mechanical sensor; a magnetic sensor for load measurement; and any combination thereof.

4. The system of claim 2, further comprising a pressure regulating valve 580 and a controller 585; said controller 585 is configured to receive said load measurement (or computation or estimation by said controller) and to compute or estimate and control the size of an oil passage opening of said pressure regulating valve 580, said size such that to achieve said substantially load-independent cruising speed and an arrival time of said cabin to a predetermined next destination is substantially independent of said load.

5. The system of claim 4, wherein said controller 585 is selected from a group consisting of an electric transducer, a potentiometer, a mechanical device, and any combination thereof.

6. The system of claim 4, wherein said controller is further configured to set said oil passage opening to a maximum size before motion of said cabin and gradually reducing said size to said size that is said function of said load, and optionally wherein said maximum opening size is set before a second said brake release.

7. The system of claim 4, further comprising a micro-switch actuation height-changing mechanism for the cabin of an elevator, comprising a floor of said cabin mounted on springs;

a first rack, rigidly mounted to said cabin;

a dual pinion comprising a small gear and a large gear, said small gear configured to roll along said first cabin rack;

a second rack, said large gear configured to roll along said second rack;

a microswitch activator, rigidly mounted on said second rack;

wherein said microswitch activator is configured to activate a slow-down limit switch of said elevator, and said system thereby receives an early warning for control of a slow-down profile enabling said cabin to reach a next destination at an arrival time that is substantially independent of said load.

8. The system of claim 4, wherein said controller is configured to set a constant said opening size, according to the vertical direction of motion of said elevator and the assumption, independent of said load, that said load is the maximum load for said elevator;

one-half the maximum load for said elevator; or a predetermined fraction of the maximum load for said elevator.

9. The system of claim 8, wherein said controller is configured to reverse the vertical direction of said elevator.

10. The system of claim 4, further comprising at least one speed sensor 539 configured to measure one or more of acceleration, deceleration, and velocity of said cabin.

11. The system of claim 10, wherein said speed sensor comprises one or more type in a group consisting of a mechanical sensor, mechanical linear or rotary encoder, electrical sensor, electrical linear or rotary encoder, magnetic sensor for velocity measurement, centrifugal speed sensor, pressure regulating valve, pressure-compensated flow control valve, or any combination thereof.

12. The system of claim 10, wherein said controller is further configured to receive said measurement from said speed sensor and adjust said opening size of said pressure regulating valve to maintain said constant cruising velocity.

13. The system of claim 12, wherein the cruise velocity and arrival time of said elevator to destinations of equal distance is substantially independent of said load.

14. The system of claim 1, wherein the speed of the hydraulic motor is controlled by two pressure-compensated hydraulic motor-flow control valves 21, 22 set primarily to a predetermined flow values by adjusting the required restriction in the fixed orifices of the hydraulic motor-flow control valves 21, 22; further wherein the cruise velocity of the hydraulic motor is fixed, pre-defined and not affected by the fluid pressure caused by the load weight.

15. The system of claim 1, wherein the more passengers and/or cargo are present in the cabin, the less mechanical and/or electric changes occur in the system; optionally, piston movement of the two pressure-compensated flow control solenoid valves 34, 35 gets smaller with increasing total weight of the elevator cabin, including passengers and cargo.

16. The system of claim 15, wherein the flow control solenoid valves are used to hold the valves' pistons in maximal open/close state according to the total weight of the elevator's cabin and the vertical direction of motion.

17. The system of claim 1, wherein said system is switchable between three modes of operation:

"Shabbat" mode, wherein the hydraulic motor operates by pressurized hydraulic liquid which is operated by pressurized air, which is supplied by said pressurized air tank and thereby said system has said load-independent electric power consumption "Normal Electric" mode, wherein an electric motor drives the elevator without the hydraulic motor; and "Normal Hydraulic" mode, wherein the hydraulic motor is fed by a pump and drives the elevator without the electric motor.

18. The system of claim 1, further configured so that the hydraulic motor begins moving the elevator after a random time delay after closing of the elevator doors, (wherein the random time delay is selected within a predefined time range and said predefined time range is substantially independent of said load.

19. The system of claim 18, wherein the random time delay is not less than a difference in time periods it takes the elevator to arrive at its next destination/floor when the cabin is empty, with no passengers and/or cargo, and with a full load.

20. The system of claim 1, further comprising a security valve configured to sense the velocity of said cabin; said system further configured, when said velocity exceeds an allowed limit, to gradually close one or more hydraulic oil passages in said system until the elevator is fully stopped safely.

21. The system of claim 12, further configured such that when a counterweight of said elevator exceeds said load, said hydraulic motor begins in a neutral operation, enabling said elevator to initially operate by gravitational forces, and said hydraulic motor gradually engages such that said substantially load-independent cruising speed is maintained.

22. The system of claim 21, wherein said cruising speed is achieved in a predetermined time or predetermined cabin location after said initial gravitational operation.

23. A pneumatic-hydraulic method for driving an elevator, comprising steps of a. providing the pneumatic-hydraulic system of claim 1;
b. operating a compressor when the conveyance is at rest;
c. charging a pressurized tank with the compressor;
d. supplying pressurized air to two pneu-hydraulic accumulators, by the pressurized tank;
e. alternately supplying fluid to a high-pressure line and a low-pressure return line of the pneu-hydraulic accumulators; and
f. powering motion of the conveyance, by fluid in the high pressure line wherein electric power consumption of said system and the cruising speed of the elevator cabin are substantially independent of the load of said cabin, including passengers and cargo riding in said cabin.

24. The method of claim 23, further comprising a step of a weighing mechanism measuring said load during a brake release, after closing of doors of said elevator and before start of motion of said cabin, thereby determining an initial hydraulic pressure.

25. The method of claim 24, further comprising a step of selecting said weighing mechanism from one or more elements in a group consisting of an axle torque sensor; measuring tension in a cable of said elevator; measuring pressure difference at two openings for the hydraulic fluid of the hydraulic motor; a strain sensor; a weight scale; a mechanical force gauge; a cylinder fluid pressure meter; a pressure difference gauge; an electric sensor; mechanical sensor; a magnetic sensor for load measurement; and any combination thereof.

26. The method of claim 24, further comprising steps of a controller receiving, and/or computing or estimating, said load measurement, computing or estimating and controlling the size of an oil passage opening of a pressure regulating valve, said size such that said substantially load-independent cruising speed is achieved and an arrival time of said cabin to a predetermined next destination is substantially independent of said load.

27. The method of claim 26, further comprising a step of selecting said controller from a group consisting of an electric transducer, a potentiometer, a mechanical device, and any combination thereof.

28. The method of claim 26, further comprising steps of said controller setting said oil passage opening to a maximum size before motion of said cabin and gradually reducing said size to said size that is said function of said load, and optionally wherein said maximum opening size is set before a second said brake release.

29. The method of claim 26, further comprising a micro-switch actuation height-changing method, comprising the steps of:

providing a floor of said cabin mounted on springs;
providing a first rack rigidly mounted to said cabin;
providing a dual pinion comprising a small gear and a large gear, said small gear configured to roll along said first cabin rack;
providing a second rack, said large gear configured to roll along said second rack; and providing a microswitch activator rigidly mounted on said second rack;

the microswitch activator activating a slow-down limit switch of said elevator, and said system thereby receiving an early warning for control of a slow-down profile, enabling said cabin to reach a next destination at an arrival time that is substantially independent of said load.

30. The method of claim 26, further comprising a step where said controller sets a constant opening size of a servo valve, according to the vertical direction of motion of said elevator and the assumption, independent of said load, that said load is:

the maximum load for said elevator;

one-half the maximum load for said elevator; or a predetermined fraction of the maximum load for said elevator.

31. The method of claim 30, further comprising a step of said controller reversing the vertical direction of said elevator.

32. The method of claim 26, further comprising a step of at least one speed sensor measuring one or more of acceleration, deceleration, and velocity of said elevator cabin.

33. The method of claim 32, further comprising a step of selecting said speed sensor from one or more types in a group consisting of a mechanical sensor, mechanical linear or rotary encoder, electrical sensor, electrical linear or rotary encoder, magnetic sensor for velocity measurement, centrifugal speed sensor, pressure regulating valve, pressure-compensated flow control valve, or any combination thereof.

34. The method of claim 32, further comprising steps of said controller receiving said measurement from said speed sensor and adjusting said opening size of said pressure regulating valve to maintain said constant cruising velocity.

35. The method of claim 34, further comprising a step of said adjustment being such that the cruise velocity and arrival time of said elevator to destinations of equal distance is substantially independent of said load.

36. The method of claim 23, further comprising steps of two pressure-compensated hydraulic motor-flow control valves controlling the speed of said hydraulic motor to predetermined flow values by adjusting the required restriction in the fixed orifices of the hydraulic motor-flow control valves, whereby the cruise velocity of the hydraulic motor is fixed, pre-defined and not affected by the fluid pressure caused by the load weight.

37. The method of claim 23, further comprising a step in which the more passengers and/or cargo are present in the cabin, the fewer mechanical and/or electrical changes occur in the system; optionally, piston movement of the two pressure-compensated flow control solenoid valves 34, 35 gets smaller with increasing total weight of the elevator cabin, including passengers and cargo.

38. The method of claim 37, further comprising a step of using the flow control solenoid valves to hold the valves' pistons in maximal open/close state according to the total weight of the elevator's cabin and the vertical direction of motion.

39. The method of claim 23, further comprising a step of switching said system between three modes of operation:

"Shabbat" mode, wherein the hydraulic motor operates by pressurized hydraulic liquid which is operated by pressurized air, which is supplied by said pressurized air tank and thereby said system has said load-independent electric power consumption "Normal Electric" mode, wherein an electric motor drives the elevator without the hydraulic motor; and "Normal Hydraulic" mode, wherein the hydraulic motor is fed by a pump and drives the elevator without the electric motor.

40. The method of claim 23, further comprising steps of the hydraulic motor beginning to move the elevator after a random time delay following the closing of the elevator doors, wherein the random time delay is selected within a predefined time range.

41. The method of claim 40, further comprising a step of the random time delay being not less than a difference in time periods it takes the elevator to arrive at its next destination/floor when the cabin is empty, with no passengers and/or cargo, and with a full load.

42. The method of claim 23, further comprising steps of a security valve sensing the velocity of said cabin; and when said velocity exceeds an allowed limit, gradually closing one or more hydraulic oil passages in said system until the elevator is fully and safely stopped.

43. The method of claim 34, further comprising steps of, when a counterweight of said elevator exceeds said load, said hydraulic motor beginning in a neutral operation, enabling said elevator to initially operate by gravitational forces; and said hydraulic motor gradually engaging such that said substantially load-independent cruising speed is maintained.

44. The method of claim 43, further comprising a step of achieving said cruising speed in a predetermined time or predetermined cabin location after said initial gravitational operation.

* * * * *